US010771411B2

(12) United States Patent
Sercantaha

(10) Patent No.: US 10,771,411 B2
(45) Date of Patent: Sep. 8, 2020

(54) DISPLAY METHOD, INFORMATION PROCESSING DEVICE, INFORMATION PROCESSING TERMINAL, DISPLAY PROGRAM

(71) Applicant: LINE Corporation, Shibuya-ku, Tokyo (JP)

(72) Inventor: Ahi Sercantaha, Tokyo (JP)

(73) Assignee: LINE CORPORATION, Tokyo (JP)

( * ) Notice: Subject to any disclaimer, the term of this patent is extended or adjusted under 35 U.S.C. 154(b) by 424 days.

(21) Appl. No.: 15/151,954

(22) Filed: May 11, 2016

(65) Prior Publication Data
US 2017/0126596 A1    May 4, 2017

(30) Foreign Application Priority Data
Oct. 30, 2015  (JP) .................. 2015-214823

(51) Int. Cl.
G06F 15/16  (2006.01)
H04L 12/58  (2006.01)
H04L 29/08  (2006.01)

(52) U.S. Cl.
CPC ............ *H04L 51/046* (2013.01); *H04L 51/34* (2013.01); *H04L 67/1097* (2013.01)

(58) Field of Classification Search
CPC ... H04L 12/1822; H04L 51/16; H04L 51/046; H04L 51/34; H04L 67/1097; H04L 51/06; H04L 47/28; H04L 47/30; H04L 67/22; H04L 51/32; H04L 51/26; H04L 51/04; H04L 51/24; G06F 3/0481; G06F 3/00; H04M 2201/42; H04M 1/72552; G06Q 50/01

(Continued)

(56) References Cited

U.S. PATENT DOCUMENTS 8,332,477 B1 * 12/2012 Kaiserlian ............. G06F 16/338
                                                             709/206
2001/0012008 A1 * 8/2001 Hongawa .............. G06F 3/0481
                                                             345/418

(Continued)

FOREIGN PATENT DOCUMENTS

JP    2012175221 A     9/2012
JP    2013-542522 A    11/2013

(Continued)

OTHER PUBLICATIONS

Japanese Office Action dated Sep. 3, 2019 issued in the corresponding Japanese Application No. 2016-245872, which is Divisional Application of Japanese Application No. 2015-214823. English translation provided.

*Primary Examiner* — Tan Doan
(74) *Attorney, Agent, or Firm* — Harness, Dickey & Pierce, P.L.C.

(57) ABSTRACT

A display method is a display method of displaying a message on a terminal, and includes receiving a message from another terminal different from the terminal, associating the message and a time at which the message is received to store the message and the time in a storage unit, and displaying a first message stored in the storage unit and a second message different from the first message at an interval based on a difference between a first time associated with the first message and a second time associated with the second message.

17 Claims, 14 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2005/0268237 A1* | 12/2005 | Crane | G06F 3/0481 |
| | | | 715/732 |
| 2007/0186172 A1 | 8/2007 | Sego et al. | |
| 2010/0125791 A1* | 5/2010 | Katis | H04M 3/42221 |
| | | | 715/716 |
| 2010/0128031 A1 | 5/2010 | Uoi et al. | |
| 2011/0078566 A1* | 3/2011 | Robertz | G06F 3/0481 |
| | | | 715/274 |
| 2011/0137727 A1* | 6/2011 | Chung | G06F 3/0346 |
| | | | 705/14.55 |
| 2012/0083260 A1* | 4/2012 | Arriola | G06F 3/04883 |
| | | | 455/418 |
| 2013/0226943 A1 | 8/2013 | Zheng et al. | |
| 2014/0136989 A1 | 5/2014 | Choi | |
| 2014/0237394 A1* | 8/2014 | Park | H04L 12/1822 |
| | | | 715/758 |

FOREIGN PATENT DOCUMENTS

| | | |
|---|---|---|
| JP | 2014-96798 A | 5/2014 |
| JP | 2014160467 A | 9/2014 |
| WO | WO-2008/029466 A1 | 3/2008 |

\* cited by examiner

FIG. 4

| MESSAGE ID | RECEPTION TIME | TRANSMITTER ID | MESSAGE MAIN TEXT |
|---|---|---|---|
| ⋮ | ⋮ | ⋮ | ⋮ |
| M20151000021 | 10/01/2015 11:21:11 | U2300983 | It was fun today! See you later! |
| M20151000022 | 10/01/2015 11:23:20 | U3209948 | See you next time! |
| M20151000023 | 11/01/2015 11:48:09 | U0028839 | I'll be going to Tokyo in a long time in late this month. Shall we meet? |
| M20151000024 | 11/01/2015 12:50:47 | U3209948 | Of course! |
| ⋮ | ⋮ | ⋮ | ⋮ |

DISPLAY METHOD, INFORMATION PROCESSING DEVICE, INFORMATION PROCESSING TERMINAL, DISPLAY PROGRAM

CROSS-REFERENCE TO RELATED APPLICATIONS

The present application is based on and claims the benefit of priority under 35 U.S.C. § 119 to Japanese Patent Application No. 2015-214823 filed on Oct. 30, 2015, the entire contents of which are incorporated herein by reference.

BACKGROUND OF THE INVENTION

Field of the Invention

The present invention relates to a method of displaying messages which are transmitted and received between a plurality of terminals.

Background Art

In recent years, messages have been exchanged between a plurality of communication devices through a chat room. In a case where messages are exchanged between such a plurality of communication devices, and a response message to a certain message is displayed after other messages are exchanged to some degree, the display is performed away from a message which is a source of the response message in some cases. This occurs because a message group exchanged between a message and a response message is displayed. For this reason, users participating in a chat room may not likely understand which message the response message is a response message to.

Consequently, a technique is disclosed in which, in a case where a response message to a specific message is displayed, a corresponding response message is displayed below the specific message using transmission and reception times of the specific message (see Japanese Unexamined Patent Application Publication No. 2014-160467).

SUMMARY OF THE INVENTION incidentally, in such a message UI, respective messages are sequentially displayed in the order in which the messages have been transmitted. For this reason, there is a problem in that users using the message UI can understand which messages and in what order the messages are transmitted, but cannot intuitively understand time intervals at which these messages have been exchanged.

The present invention is contrived in view of the above problem, and an object thereof is to provide a display method, an information processing device, an information processing terminal, and a message display program which are capable of providing a message UI through which a user can intuitively understand time intervals at which messages have been exchanged.

In order to solve the above problem, according to an embodiment of the present invention, there is provided a display method of displaying a message on a terminal, including: receiving a message from another terminal different from the terminal; associating the message and a time at which the message is received to store the message and the time in a storage unit; and displaying a first message stored in the storage unit and a second message different from the first message at an interval based on a difference between a first time associated with the first message and a second time associated with the second message.

In addition, according to an embodiment of the present invention, there is provided an information processing device that relays communication of a plurality of terminals and transmits display information for di splaying a message transmitted from each terminal, to the plurality of terminals, the device including: a receiving unit that receives a message from a terminal; a storage unit that stores the message and a time at which the message is received in association with each other; a generation unit that generates display information for displaying a first message stored in the storage unit and a second message different from the first message, on a display unit, at an interval based on a difference between a first time at which the first message is received and a second time at which the second message is received; and a transmission unit that transmits the display information generated by the generation unit to the plurality of terminals.

In addition, according to an embodiment of the present invention, there is provided an information processing terminal that executes communication with another terminal, and displays messages transmitted and received to and from the another terminal on a display screen, the terminal including: a receiving unit that receives a message from the another terminal; a storage unit that stores the message received by the receiving unit and a time at which the message is received in association with each other; and a display unit that displays a first message stored in the storage unit and a second message different from the first message at an interval based on a difference between a first time associated with the first message and a second time associated with the second message.

In addition, according to an embodiment of the present invention, there is provided a display program causing a computer of a terminal to display messages transmitted and received to and from another terminal on a display screen, the program causing the computer of the terminal to realize the following functions of: receiving a message from another terminal; storing the message and a time at which the message is received in association with each other, in a storage unit; and displaying a first message stored in the storage unit and a second message different from the first message at an interval based on a difference between a first time associated with the first message and a second time associated with the second message.

According to a server, a terminal, and a display program according to an aspect of the present invention, it is possible to realize displaying messages exchanged between terminals at a display interval based on a reception time of each message. Therefore, it is possible to cause a user to intuitively recognize a time interval at which each message has been received.

BRIEF DESCRIPTION OF THE DRAWINGS

FIG. 4 is a data conceptual diagram illustrating a data configuration example of message information according to the embodiment.

DETAILED DESCRIPTION OF THE INVENTION

Each embodiment of a server and a terminal according to the present embodiment will be described with reference to the accompanying drawings.

Embodiment 1

Figure 1:
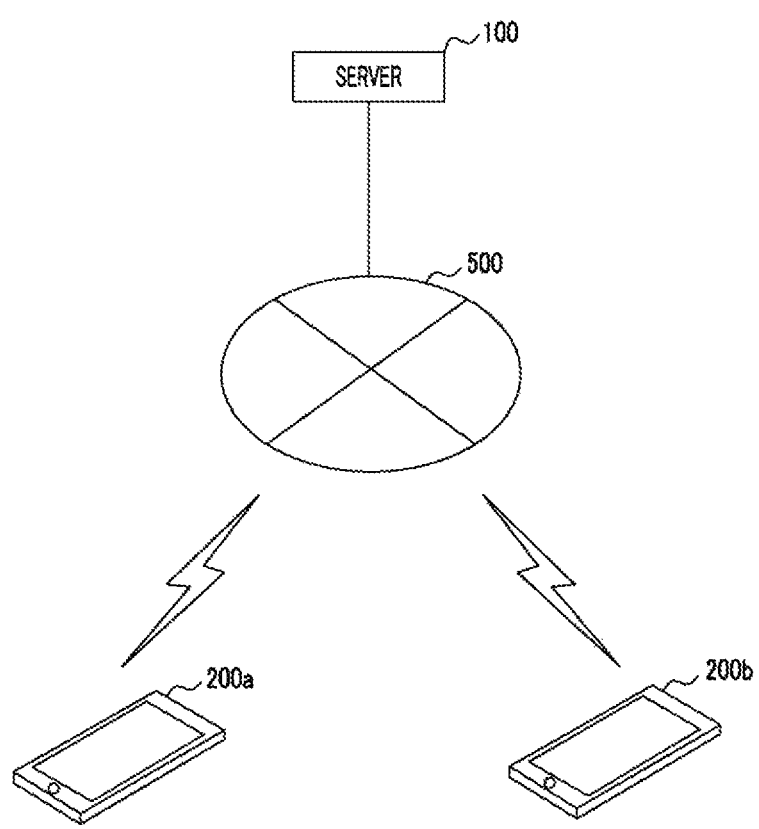
FIG. 1 is a system diagram illustrating a system configuration of a communication system according to Embodiment 1.

FIG. 1 is a system diagram illustrating a system configuration of a communication system according to Embodiment 1. As shown in FIG. 1, the communication system includes a server 100, and the server 100 executes communication with a user terminal 200a or a user terminal 200b through a network 500. Here, the user terminal 200a and the user terminal 200b enjoy the same messaging service which is provided by the server 100. The messaging service includes a service in which messages which are exchanged between user terminals are relayed and transmitted to the other side. Meanwhile, in FIG. 1, only two user terminals are shown, but an infinite number of users registered with the service are assumed to be present. Meanwhile, in the following, in a case where user terminals are not required to be particularly distinguished from each other, the user terminals are described as a user terminal 200 collectively.

Configuration

An information processing device according to an embodiment of the present invention is an information processing device 100 that relays communication between a plurality of terminals and transmits display information for displaying a message, transmitted from each terminal, to the plurality of terminals, and includes a receiving unit 111 that receives messages (sentence contents of messages, main text) from the terminals 200a and 200b, a storage unit 120 that stores a message and a time at which the message is received in association with each other, a generation unit 131 that generates display information for displaying a first message stored in the storage unit and a second message different from the first message on a display unit at an interval based on a difference between a first time at which the first message is received and a second time at which the second message is received, and a transmission unit 112 that transmits the display information generated by the generation unit to the plurality of terminals. The information processing device 100 is a type of processing device that processes message information received from each terminal and transmits display information, generated by processing the message information received from each terminal, to each terminal.

Figure 2:
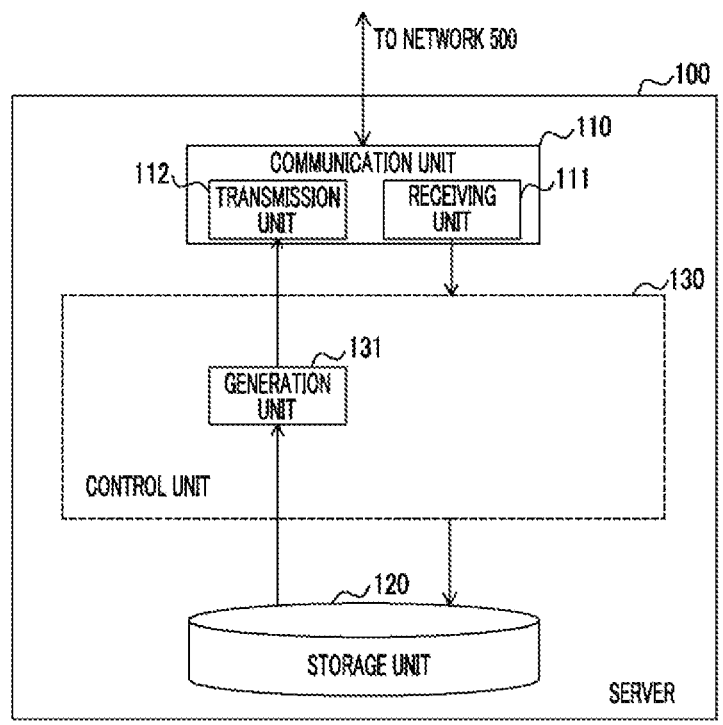
FIG. 2 is a block diagram of a server according to Embodiment 1.

A more detailed description will be given with reference to FIG. 2. FIG. 2 is a block diagram illustrating a configuration of the server 100 according to Embodiment 1. As shown in FIG. 2, the server 100 includes a communication unit 110, a storage unit 120, and a control unit 130.

The communication unit 110 includes a receiving unit 111 and a transmission unit 112, and has a function of executing communication with each user terminal 200 through the network 500. The communication may be executed in either a wired or wireless manner, and any communication protocol may be used therein insofar as mutual communication can be executed.

The receiving unit 111 has a function of transmitting data received from each user terminal 200 to the control unit 130 through the network 500. The receiving unit 111 receives a message which is a user's utterance created using the user terminal 200 in a talking room, and transmits the message to the control unit 130. The message includes a transmission time of the message, transmitter information indicating a transmit ter of the message, talking room identification information indicating a talking room to which the message corresponds, and information of main text of the message.

The transmission unit 112 has a function of transmitting display information to be displayed on each user terminal 200, on the basis of instructions from the control unit 130.

The storage unit 120 has a function of storing various types of programs and data which are required for the server 100 to operate. The storage unit 120 stores message information 400 including information of messages exchanged between users who are using a service. The storage unit 120 is typically realized by a hard disc drive (HDD), a solid state drive (SSD), a flash memory or the like and various types of recording media. The message information 400 is updated by the control unit 130 whenever the server 100 receives a message from a user terminal. Here, the message information 400 is assumed to be generated for each talking room created between users who are exchanging messages, and to be stored in the storage unit 120. The message information 400 is information including transmission time information of the messages, transmitter information of the messages, and main text information of the messages. The details of the message information 400 will be described later. In addition, the talking room is equivalent to a so-called chat room in which a plurality of users participate, and messages are exchanged.

The control unit. 130 is a processor having a function of controlling each unit of the server 100. The control unit 130 executes a process relating to a service which is provided by the server 100. As part of the service, the control unit 130 updates the message information 400 stored in the storage unit 120 on the basis of a message received from the receiving unit 111, and generates display information to be displayed on a user terminal.

The control unit 130 includes a generation unit 131. The generation unit 131 has a function of generating display information which is displayed on each user terminal 200. The generation unit 131 transmits the generated display information to the transmission unit 112.

The generation unit 131 refers to the message information 400 of a message of each user, to generate display information for displaying each message on the user terminal 200 at a time interval based on each reception time. Specifically, the generation unit 131 generates display information in a case where the receiving unit 111 receives a new message and the control unit 130 updates the message information 400.

The generation unit 131 refers to reception times of the message information 400 with respect to continuous messages, to calculate a difference between the reception times. Thereby, it is possible to calculate a time interval between the reception times of the continuous messages. The calculated time interval is multiplied by a predetermined display interval coefficient for converting the time interval into a display interval for displaying messages. The generation unit 131 compares the calculated display interval with a predetermined threshold. The threshold is a threshold which is set so as to be capable of displaying the predetermined number of messages within a display screen of the user terminal 200. In a case where the calculated display interval exceeds the predetermined threshold, it is determined that the predetermined number of messages is not displayed within one screen and the predetermined display interval coefficient is reduced by a predetermined value, to thereby calculate a new coefficient. A display interval is calculated on the basis of the new coefficient. This is repeated until the calculated display interval is set to be equal to or less than a predetermined threshold. Display information for displaying each message is generated at a display interval finally determined. The generation unit 131 transmits the generated display information to the transmission unit 112. Meanwhile, herein, the server 100 uses a reception time at which a message is received from a terminal, but may use a time at which the message is transmitted by the terminal. In this case, the message may be given information indicating a time at which the message is transmitted by the terminal, as metadata.

Meanwhile, the display interval coefficient is uniform with respect to one talking room, and the same display interval coefficient is used even when a display interval between any messages is calculated. Therefore, in a case where the display interval coefficient is changed, the coefficient is applied to all the display intervals for displaying respective messages to be displayed in the talking room. Thereby, a display aspect can be realized in which, when a reception interval at which a message and another message are received is short, that is, a difference between the reception times is small, an interval between the message and another message is displayed shortly, and when a reception interval at which the message and another message are received is long, that is, a difference between the reception times is great, a interval between the message and another message is displayed longly. Thereby, in a case where the sizes of display screens are different from each other or a display size is changed, it is possible to set a display interval based on a time interval even in a case where a character font size is changed, or the like.

The above is the configuration of the server 100.

Next, the configuration of the user terminal 200 will be described. The user terminal 200 is a terminal having at least a communication function which is referred to as, what is called, a cellular phone, a smartphone or the like.

Figure 3:
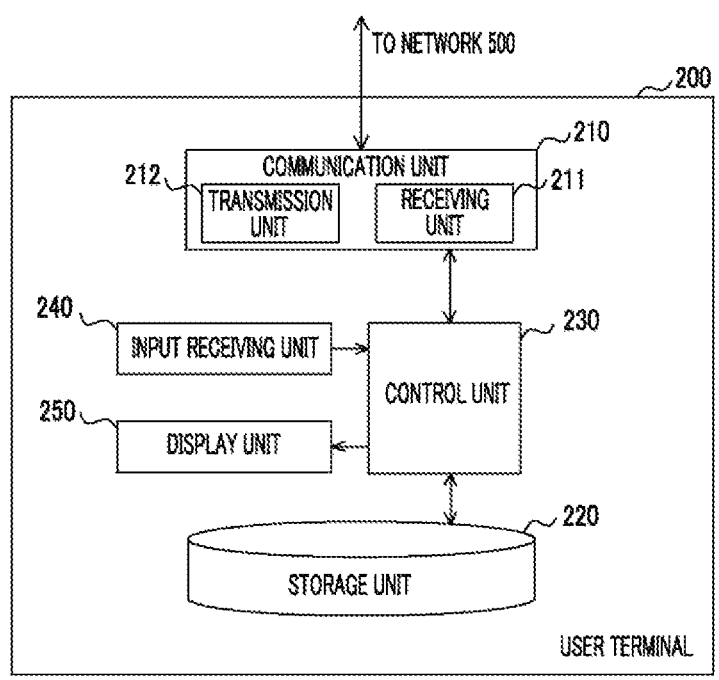
FIG. 3 is a block diagram of a terminal according to Embodiment 1.

FIG. 3 is a block diagram illustrating the configuration of the user terminal 200. As shown in FIG. 3, the user terminal 200 includes a communication unit 210, a storage unit 220, a control unit 230, an input receiving unit 240, and a display unit 250.

The communication unit 210 includes a receiving unit 211 and a transmission unit 212, and has a function of executing communication with the server 100 or other user terminals through the network 500. The communication may be executed in either a wired or wireless manner, and any communication protocol may be used therein insofar as mutual communication can be executed.

The receiving unit 211 has a function of transmitting data, received from the server 100 or other user terminals 200, to the control unit. 130 through the network 500.

The transmission unit 212 has a function of transmitting data to the server 100 or other user terminals 200 on the basis of instructions from the control unit 130. The transmission unit 212 transmits a message received from a user through the input receiving unit 240 in accordance with instructions from the control unit 230. The message includes a transmission time of the message, transmitter information indicating a transmitter of the message, talking room identification information indicating a talking room to which the message corresponds, and information of a main text of the message.

The storage unit 220 has a function of storing various types of programs and data which are required for the user terminal 200 to operate. The storage unit 220 stores display information for displaying a message received from the server 100. The storage unit 120 is typically realized by a hard disc drive (HDD), a solid state drive (SSD), a flash memory or the like and various types of recording media.

The control unit 230 is a processor having a function of controlling each unit of the user terminal 200. The user terminal 200 operates similarly to a portable terminal such as a cellular phone or a smartphone, generally known, by the control unit 230 executing various types of programs which are stored in the storage unit 220. In the present embodiment, in a case where display information is received from the server 100 through the communication unit 210, the control unit 230 has a function of displaying the display information on the display unit 250.

The input receiving unit 240 has a function of receiving an input from a user, and is realized by a soft key or a hard key such as a touch panel.

The display unit 250 is a monitor having a function of displaying the display information transmitted from the server 100 in accordance with display data written in a frame buffer by the control unit 230. The display unit 250 is realized by, for example, a liquid crystal display (LCD), an organic electronic luminescence (EL) display, a plasma display, or the like.

The above is the configuration of the user terminal 200.

Data

FIG. 4 is a data conceptual diagram illustrating a data configuration example of the message information 400. As shown in FIG. 4, the message information 400 is information in which a message ID 401, a reception time 402, a transmitter ID 403, and a message main text 404 are associated with each other.

The message ID 401 is unique identification information which is given for identifying a message.

The reception time 402 is information indicating a time at which a corresponding message is received.

The transmitter ID 403 is unique identification information on a communication system for specifying a transmitter who transmits a message.

The message main text 404 is information indicating a main text of contents of a transmitted message.

In FIG. 4, for example, a message of which the message ID is indicated by "M20151000021" is transmitted at "11:21:11 Oct. 1, 2015", the transmitter ID having a terminal who has transmitted the message is "U2300983" and the contents of the message main text is "It was fun today! See you later !"

The information is stored in the storage unit 120, and is added and updated to the lowermost stage of the message information 400 of a corresponding talking room whenever a message is received. Thereby, the server 100 can provide display information to a user terminal 200 who is participating in the talking room.

Operation

Figure 5:
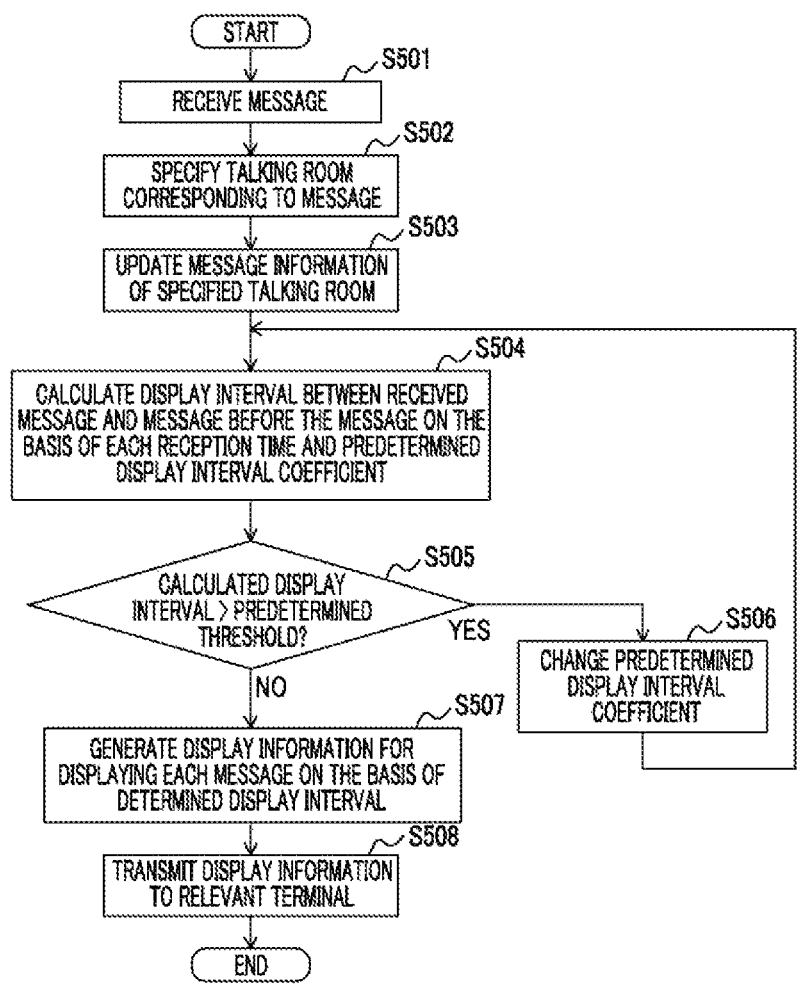
FIG. 5 is a flow diagram illustrating an operation of the server according to Embodiment 1.

FIG. 5 is a flow diagram illustrating an operation of the server 100 according to the present Embodiment 1. As shown in FIG. 5, first, the receiving unit 111 of the server 100 receives a message from the user terminal 200 (step S501). The receiving unit 111 having received a message transmits the received message to the control unit 130.

The control unit 130 specifies which talking room the transmitted message corresponds to, with reference co talking room identification information which is associated with the message (step S502). The control unit 130 adds and updates information of a newly received message to the message information 400 corresponding to the specified talking room (step S503).

The control unit 130 determines a display interval between the received message and a message received before the received message (step S504). Specifically, the control unit takes a difference between a reception time of the received message and a reception time of the message received before the received message. The control unit 130 multiplies the calculated difference by a predetermined display interval coefficient, and determines a display interval.

The control unit 130 determines the display interval, and then determines whether the display interval exceeds a predetermined threshold (step S505). In a case where the predetermined threshold is exceeded (YES in step S505), it is meant that the predetermined number of messages is not able to be displayed within one screen, and thus the control unit 130 changes the predetermined display interval coefficient (step S506). That is, the display interval coefficient is changed to a smaller value. The control unit 130 returns to the process of step S504.

On the other hand, in step S505, in a case where the control unit 130 determines that the determined display interval does not exceed the predetermined threshold, that is, the display interval is equal to or less than the predetermined threshold (NO in step S505), display information for displaying each message is generated on the basis of the determined display interval (step S507).

The control unit 130 transmits the generated display information to the transmission unit 112, and the transmission unit 112 transmits the transmitted display information to the user terminal 200 of each user included in a talking room.

The above is the operation of the server 100 according to Embodiment 1.

Display Example

Based on the above-described processes of the server 100, the user terminal 200 having received the display information from the server 100 displays the display information on the display unit 250, in accordance with instructions from the control unit 230. Meanwhile, in this case, the display information may be displayed through the input receiving unit 240 in accordance with instructions from a user. A display example of this display information is shown in FIG. 6.

Figure 6:
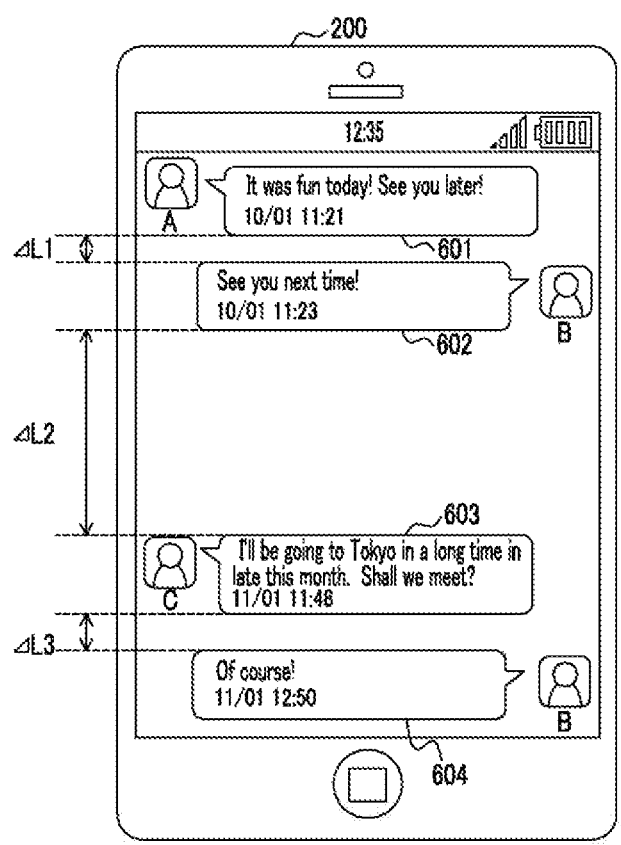
FIG. 6 is a screen diagram illustrating a display example of messages according to the embodiment.

As shown in FIG. 6, messages 601 to 604 which are utterances of respective users are displayed at display intervals based on the reception times of the front and rear messages, respectively. Specifically, a display interval ΔL1 between the message 601 and the message 602, a display interval ΔL2 between the message 602 and the message 603, and a display interval ΔL3 between the message 603 and the message 604 are set to lengths based on differences between the reception times at which the respective messages are received. Therefore, the respective messages are displayed at the same ratio as the ratio of the differences between the reception times of the respective messages. Meanwhile, for other messages, a user performs a swipe operation a display screen upward or downward, thereby allowing past or previous messages to be scrolled and displayed.

Through such a display, a user of the user terminal 200 can recognize the time intervals at which the respective messages have been received at a glance, and can intuitively recognize elapsed times using a distance between the messages.

Embodiment 2

In Embodiment 1, an example is illustrated in which the server 100 generates display information to transmit the generated information to each user terminal 200, and the display shown in FIG. 6 is realized. In Embodiment 2, an example in which a user terminal 700 generates display information will be described.

Configuration

The user terminal 700 according to Embodiment 2 is an information processing terminal that executes communication with another terminal and displays messages transmitted and received to and from another terminal on a display screen, the user terminal including a receiving unit 711 that receives a message from another terminal, a storage unit 720 that stores the message received by the receiving unit and a time at which the message is received in association with each other, and a display unit 250 that displays a first message stored in the storage unit and a second message different from the first message, at an interval based on a difference between a first time associated with the first message and a second time associated with the second message.

In a system configuration according to Embodiment 2, as in FIG. 1, the user terminal 700 is merely located in place of the user terminals 200a and 200b shown in FIG. 1.

Figure 7:
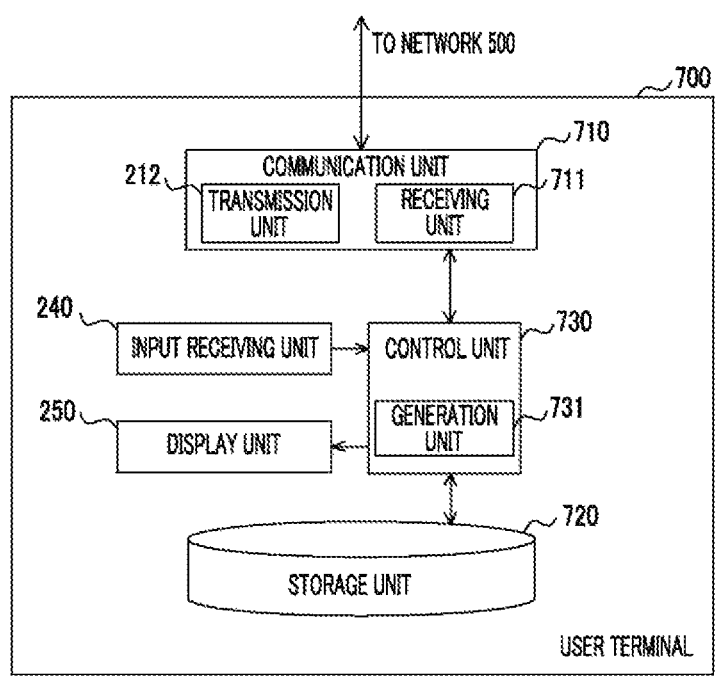
FIG. 7 is a block diagram of a terminal according to Embodiment 2.

The user terminal according to Embodiment 2 will be described in more detail with reference to FIG. 7. FIG. 7 is a block diagram illustrating a specific example of a configuration of the user terminal 200 according to Embodiment 2. As shown in FIG. 7, the user terminal 200 includes a communication unit 210, a storage unit 220, a control unit 230, an input receiving unit 240, and a display unit 250.

Since the basic configuration thereof is the same as the configuration of the user terminal 200 shown in Embodiment 1, the description of configurations operating similarly herein will not be given, and only different configurations will be described.

A communication unit 710 includes a receiving unit 711 and a transmission unit 212, and the receiving unit 711 further receives messages from other user terminals through the server 100. When the receiving unit 711 receives the messages from other user terminals, the receiving unit transmits the messages to a control unit 730.

The storage unit 720 has the same function as that of the storage unit 220 shown in Embodiment 1, and additionally stores the message information 400 held by the server 100, in Embodiment 1. The message information 400 in this case has transmission and reception times associated therewith indicating a time at which a host terminal transmits a message or a time at which a message is received from another terminal, instead of the reception time 402.

The control unit 730 has the same function as that of the control unit 230 shown in Embodiment 1, and additionally, when a message is transmitted from the receiving unit 711, the control unit adds and updates information relating to the message to the message information 400 stored in the storage unit 720.

In addition, the control unit 730 includes a generation unit 731, and the generation unit 731 has a function of generating display information for displaying a message. In the display information, a display interval between a message and another message is set to an interval based on a difference between reception times or transmission times of the respective messages. That is, the generation unit 731 has the same function as that of the generation unit 131 held by the server 100 of Embodiment 1.

The display unit 250 displays the display information generated by the generation unit 731 of user terminal 700, for example, as shown in FIG. 6.

Operation

Figure 8:
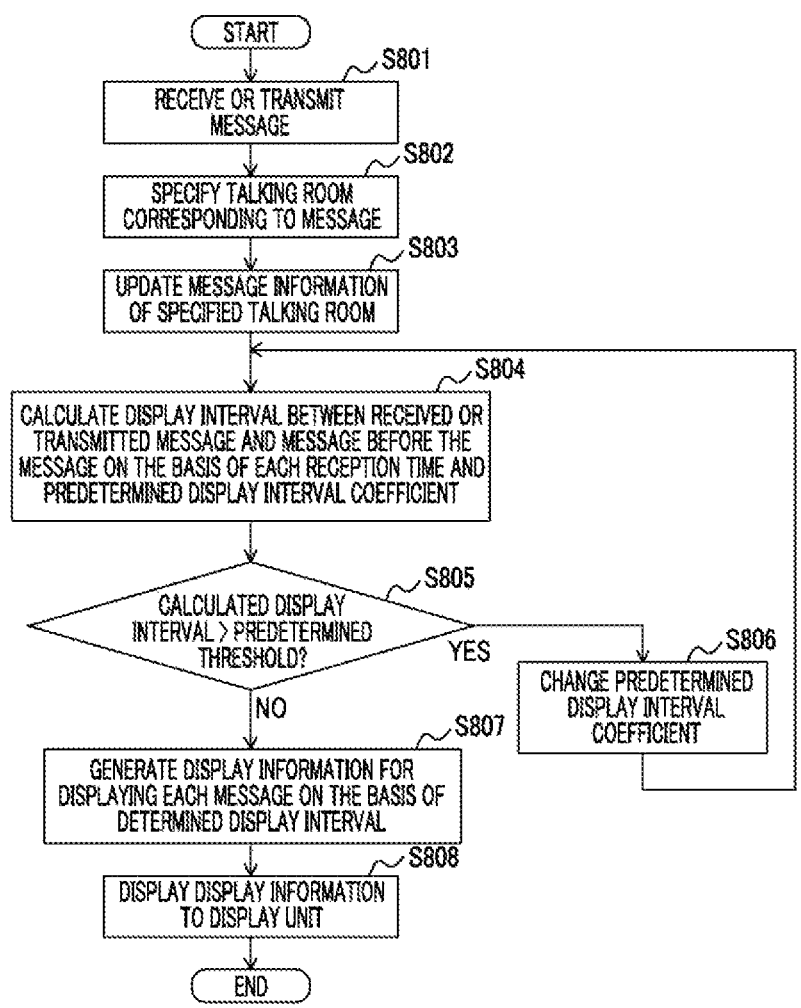
FIG. 8 is a flow diagram illustrating an operation of the terminal according to Embodiment 2.

FIG. 8 is information indicating an operation of the user terminal 700. As shown in FIG. 8, the user terminal 700 transmits or receives a message (step S801). That is, a transmission unit 712 transmits a message which is input by a user of the user terminal 700, or the receiving unit 711 receives a message which is transmitted by another user terminal.

The control unit 730 specifies a talking room corresponding to the transmitted message or the received message (step S802). The control unit 730 adds and updates information relating to the transmitted message or the received message to the message information 400 of the specified talking room (step S803).

When the message information 400 is updated, the generation unit 731 determines display intervals between the transmitted or received message and messages transmitted and received before that, on the basis of the reception time and the predetermined display interval coefficient, respectively (step S804). Specifically, the reception time of the transmitted or received message and the reception time of the message before that are referred to, with reference to the message information 400. A difference between both the reception times is taken. The difference is multiplied by the predetermined display interval coefficient, and a display interval is calculated.

The generation unit 731 compares the calculated display interval with a predetermined threshold (step S805). In a case where the calculated display interval is larger than the predetermined threshold (YES in step S805), it is meant that the predetermined number of messages is not able to be displayed within one screen, and thus the generation unit 731 changes the predetermined display interval coefficient (step S806). Specifically, the generation unit 731 reduces the predetermined display interval coefficient. The control unit 700 returns to the process of step S804.

On the other hand, in a case where the calculated display interval is not larger than the predetermined threshold, that is, is equal to or less than the predetermined threshold (NO in step S805), the generation unit 731 generates display information for displaying each message on the basis of the determined display interval.

The control unit 700 transmits the display information generated by the generation unit 731 to the display unit 250. The display unit 250 displays the transmitted display information (step S808).

Based on the above-described processes, the user terminal 700 generates the display information by itself without receiving the display information from the server 100, and thus can display the display interval between the messages using a distance based on a difference between the respective reception times or transmission times, for example, as shown in FIG. 6.

Reference Example

Each embodiment according to the present invention has been described, but it goes without saying that the idea according to the present invention is not limited thereto. Hereinafter, various types of reference examples included as the idea according to the present invention will be described.

(1) In Embodiments 1 and 2, it is shown that the display information displays each message. However, there is no limitation thereto. The generation unit may thread messages all together, and display the thread in addition to the messages.

Figure 9:
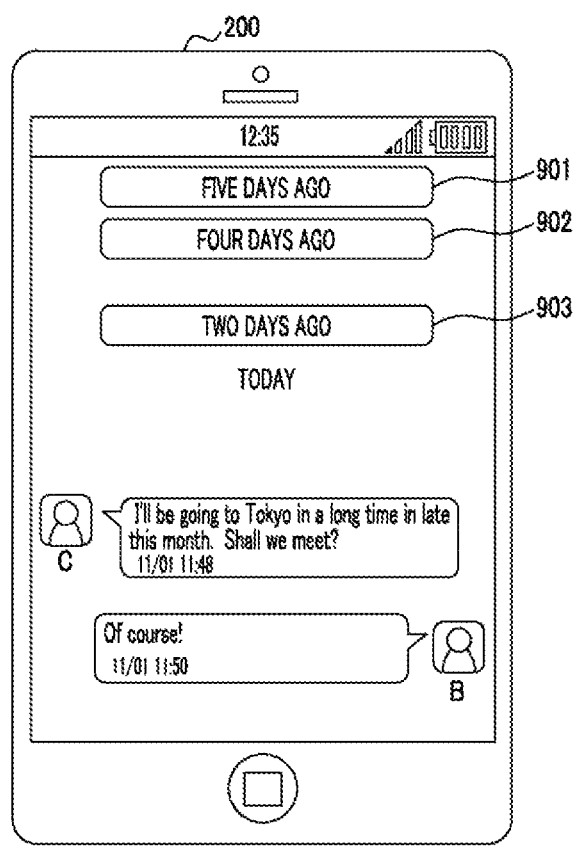
FIG. 9 is a screen diagram illustrating a display example of messages according to a reference example.

FIG. 9 is a screen diagram illustrating an example of threaded displays. As shown in FIG. 9, buttons 901 to 903 obtained by threading message groups in units of predetermined periods may be displayed with respect to the exchange of messages which are not created in the talking room in addition to messages of users. Each of the buttons includes information indicating each unit period. FIG. 9 shows an example in which the unit period is divided on a daily basis. The button 901, the button 902, and the button 903 correspond to threads of message groups exchanged five days ago, four days ago, and two days ago, respectively. By touching each of these buttons, the thread of the day is developed and displayed in the lower portion of a screen. FIG. 9 shows an example in which a today's button is touched. Thereby, the management of messages in units of periods is facilitated. Meanwhile, in the example of FIG. 9, a corresponding button is not displayed due to no message exchanged three days ago being present. In addition, similarly to a message, each of these buttons may also be displayed at a display interval based on the time interval between a period indicated by a button and a period indicated by another button.

Figure 10:
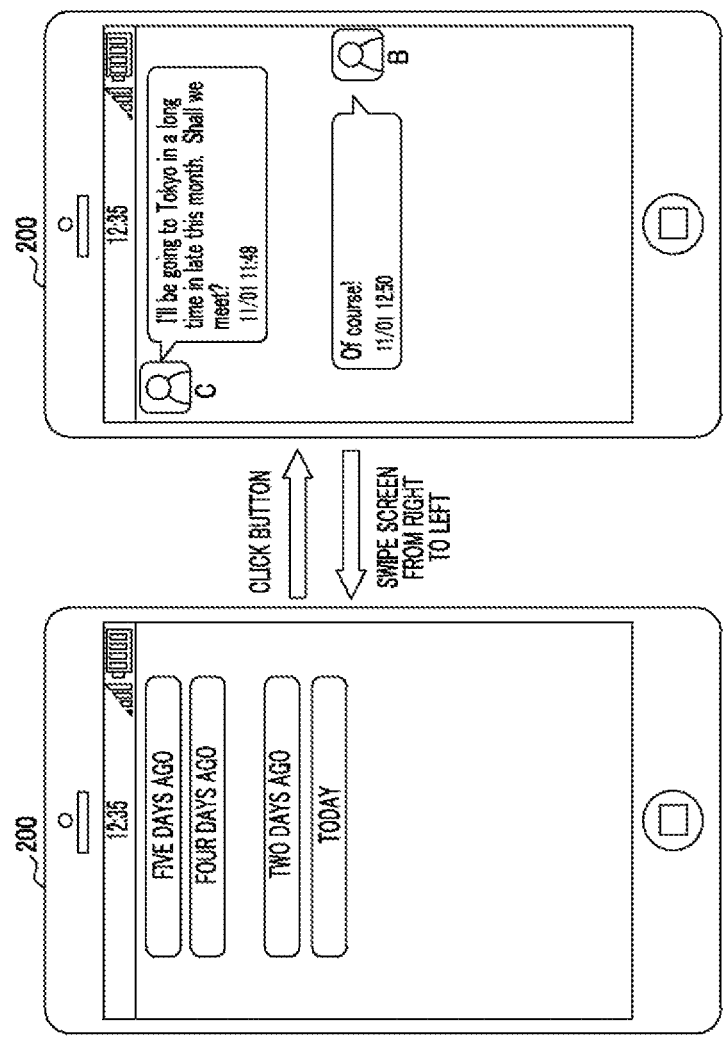
FIG. 10 is a screen diagram illustrating a transition of a display example of the messages according to the reference example.

In addition, in a case where messages are threaded in units of periods in this manner, messages are not displayed in the lower portion of the screen, and a display as shown in FIG. 10 may be performed instead. The left portion of FIG. 10 shows a state where only buttons corresponding to threads are displayed. By touching any of these buttons, messages corresponding to the touched period are developed as shown in the right portion of FIG. 10. In this case, as shown in the embodiment, the respective messages may be displayed so that the display interval between the messages is based on a difference between the reception times. In a state of a display in the right portion of the screen, a swipe operation is performed from the right side of the screen toward the left side thereof, and thus the above display may be returned to a display in the left portion of the screen. The control unit 130 of the server 100 shown in Embodiment 1 or the control unit 730 of the user terminal 700 shown in Embodiment 2 may generate display information for realizing such a display (display for developing messages corresponding to a case where a button which is period display information indicating a period unit is selected). In addition, the display information after development may be executed after a button is selected. In that case, the server 100 receives selection information of a button from a user terminal, generates display information after development of messages, and transmits the generated display information after development of messages to the selected user terminal.

Figure 11:
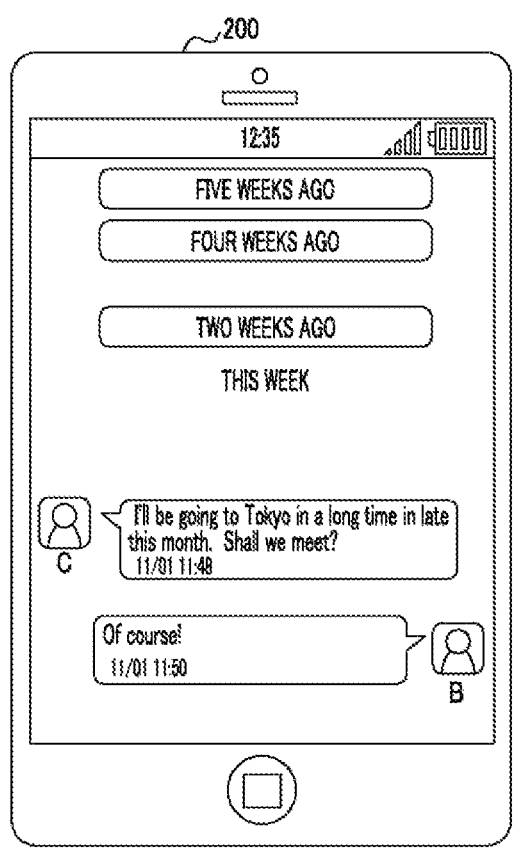
FIG. 11 is a screen diagram illustrating a display example of the messages according to the reference example.

In addition, the unit period may be other periods without being limited to one day, and may be a week unit as shown in FIG. 11. In addition, the unit period may be a month unit.

In addition, a configuration may be taken in which buttons of a plurality of period units are mixed. The generation unit may perform, for example, threading on messages close to the present in units of days, and perform threading in units of weeks in a case where a few days have elapsed, to thereby generate display information buttons of a week unit and buttons of a day unit are mixed.

(2) A display aspect of messages shown in the embodiment is an example, and other display modes may be used. An example thereof is shown in FIG. 12.

Figure 12:
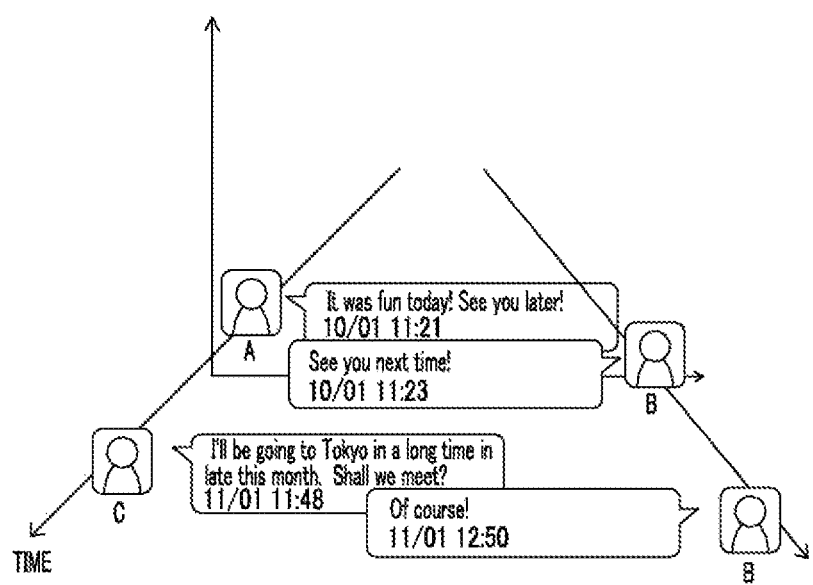
FIG. 12 is a screen diagram illustrating a display example of the messages according to the reference example.

FIG. 12 shows an example in which respective messages are displayed stereoscopically. In that case, the display interval between the respective messages may be displayed at a display interval based on a difference between the respective reception times. In the case, the generation unit may generate display information for displaying the messages pseudo-stereoscopically, and generate a parallax image based on the display information in order to realize a stereoscopic view. The display unit 250 may alternately display a right-eye parallax image and a left-eye parallax image.

(3) In the above, although not particularly described, the display modes shown in the embodiments or the reference examples may be able to be selected with a user's intention. An example thereof is shown in FIG. 13.

Figure 13:
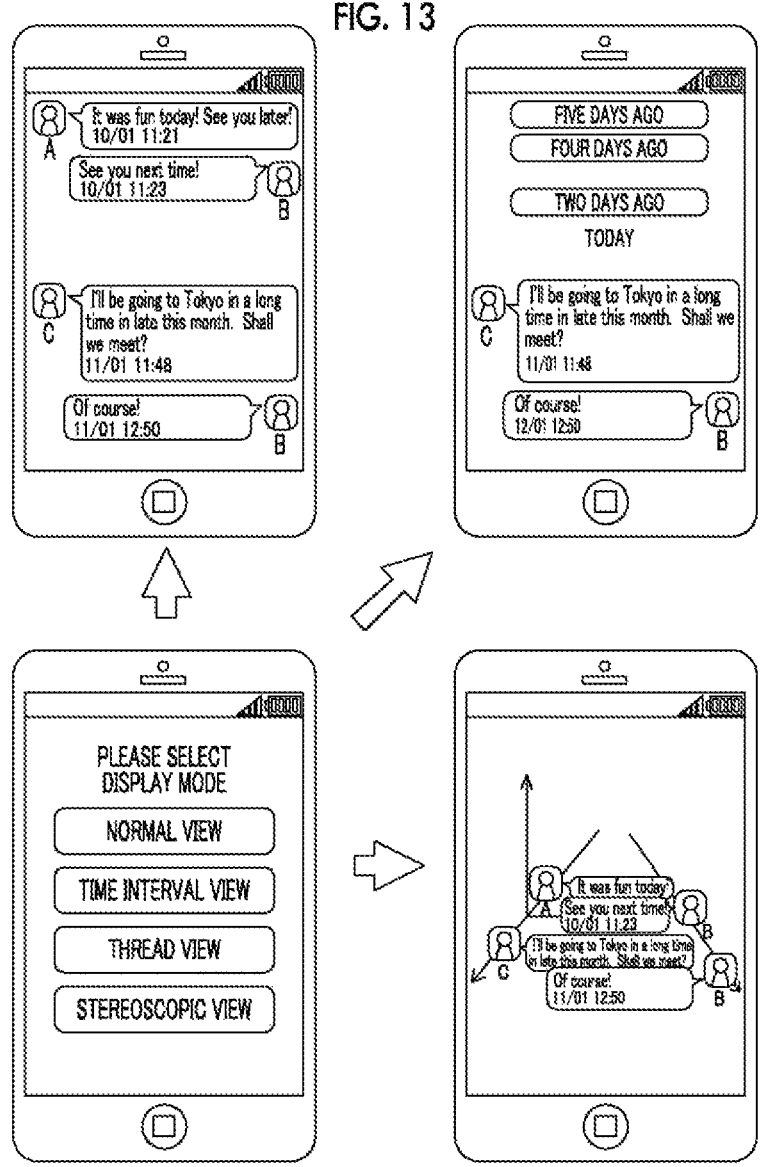
FIG. 13 is a screen diagram illustrating a display example of the message according to the reference example.

As shown in the lower left side of FIG. 13, a user terminal may be able to set a display mode of messages from a menu screen. The setting may be performed whenever a messaging service which is provided by the server 100 is started up, and may be a constant setting until the setting is changed when the messaging service is used.

In a case where a user selects "time interval view" on the screen, a user terminal performs a display described in Embodiment 1 as shown in the upper left side of FIG. 13. In a case where the user selects "thread view", the user terminal performs a display described in the reference example (1) as shown in the upper right side of FIG. 13. In a case where the user selects "stereoscopic view", a display described in the reference example (2) is performed. Meanwhile, although not shown in FIG. 13, "normal view" refers to a display mode as in the related art for displaying an interval between messages with reduced margins.

(4) In Embodiments 1 and 2, the message information 400 is held for each talking room, but there is no limitation thereto. Each message and a talking room can be associated with each other using other methods. That is, only one piece of the message information 400 is held, and it is possible to make the realization thereof in the message information 400 by associating talking room identification information for specifying a talking room with each message.

(5) In Embodiments 1 and 2, a process of comparing the calculated display interval with the predetermined threshold is performed, but this process may be omitted.

In addition, display information is generated at a display interval calculated in reality instead of the process, and it is determined whether the predetermined number of messages is able to be displayed within one screen in the display information. Thereby, the display interval coefficient may be reduced in a case where it is determined that the display is not able to be performed.

Figure 14A:
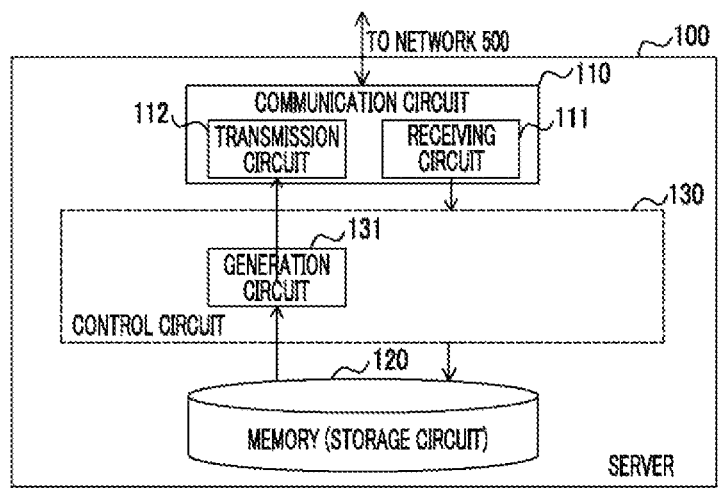
FIGS. 14A and 14B are block diagrams illustrating a configuration example of a server according to the reference example.
Figure 14B:
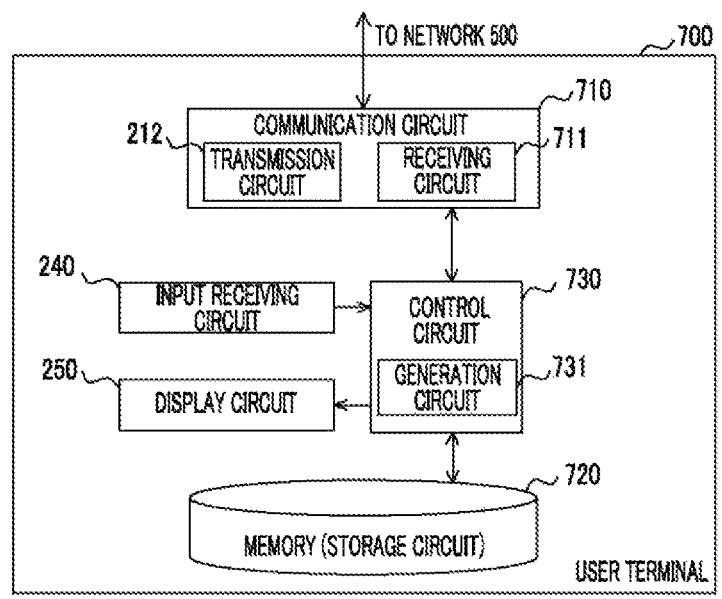

(6) Each function unit of the server 100 and the user terminals 200 and 700 may be realized by a logic circuit (hardware) or a dedicated circuit formed in an integrated circuit (integrated circuit (IC) chip, large scale integration (LSI)) or the like, and may be realized by software using a central processing unit (CPU) and a memory. In addition, each function unit may be realized by one or a plurality of integrated circuits, and functions of a plurality of function units may be realized by one integrated circuit. The LSI is referred to as a VLSI, a super-LSI, an ultra-LSI or the like, in some cases, depending on a difference in the degree of integration. FIG. 14A shows an example in which each function unit of the server 100 is formed by a circuit, and FIG. 14B shows an example in which each function unit of the user terminal 700 is formed by a circuit. Meanwhile, the "circuit" as used herein may include an implication as digital processing based on a computer, that is, functional processing based on software. In addition, the circuit may be realized by a reconstructible circuit (for example, field programmable gate away (FPGA)).

In a case where each function unit of the server 100 and the user terminals 200 and 700 is realized by software, the server 100 or the user terminals 200 and 700 include a CPU that executes a command of a display information generation program which is software for realizing each function, a read only memory (ROM) or a storage device (called a "recording medium") having the retrieval program and various types of data recorded thereon so as to be readable in a computer (or CPU), a random access memory (RAM) that develops the retrieval program, and the like. A computer (or CPU) reads and executes the retrieval program from the recording medium, and thus an object of the present invention is achieved. An example of the recording medium capable of being used includes a "non-transitory tangible medium" such as, for example, a tape, a disk, a card, a semiconductor memory, or a programmable logic circuit. In addition, the retrieval program may be supplied to the computer through any transmission medium (such as a communication network or a broadcast wave) capable of transmitting the retrieval program. The present invention can also be realized in a form of a carrier wave-buried data signal in which the retrieval program is embodied by electronic transmission.

Meanwhile, the retrieval program can be installed, for example, using a script language ActionScript or JavaScript (Registered Trademark), an object-oriented programming language such as Objective-C or Java (Registered Trademark), a markup language such as HTML5, and the like.

(7) Although the present invention has been described on the basis of the drawings and examples, it is noted that those skilled in the art can easily perform various modifications or corrections on the basis of the present disclosure. Therefore, it is noted that these modifications or corrections are included in the scope of the present invention. For example, the functions included in each means and each step, and the like can be rearranged so as not be logically contradicted with each other, and a plurality of means, steps and the like can be combined into one, or be divided into several parts.

(8) The configurations shown in the embodiments and various types of modification examples may be appropriately combined.

Supplement

Here, an embodiment of the present invention and the effect thereof will be described.

(a) According to an embodiment of the present invention, there is provided a message display method of displaying a message on a terminal, including: a step of receiving a message from another terminal different from the terminal; a step of storing the message and a time at which the message is received, in a storage unit, in association with each other; and a step of displaying a first message stored in the storage unit and a second message different from the first message at an interval based on a difference between a first time associated with the first message and a second time associated with the second message.

In addition, according to an embodiment of the present invention, there is provided an information processing device that relays communication of a plurality of terminals and transmits display information for displaying a message transmitted from each terminal, to the plurality of terminals, the device including: a receiving unit that receives a message from a terminal; a storage unit that stores the message and a time at which the message is received in association with each other; a generation unit that generates display information for displaying a first message stored in the storage unit and a second message different from the first message, on a display unit, at an interval based on a difference between a first time at which the first message is received and a second time at which the second message is received; and a transmission unit that transmits the display information generated by the generation unit to the plurality of terminals.

In addition, according to an embodiment of the present invention, there is provided an information processing terminal that executes communication with another terminal, and displays messages transmitted and received to and from the another terminal on a display screen, the terminal including: a receiving unit that receives a message from the another terminal; a storage unit that stores the message received by the receiving unit and a time at which the message is received in association with each other; and a display unit that displays a first message stored in the storage unit and a second message different from the first message at an interval based on a difference between a first time associated with the first message and a second time associated with the second message.

In addition, according to an embodiment of the present invention, there is provided a display program causing a computer of a terminal to display messages transmitted and received to and from another terminal on a display screen, the program causing the computer of the terminal to realize the following functions of: receiving a message from another terminal; storing the message and a time at which the message is received in association with each other, in a storage unit; and displaying a first message stored in the storage unit and a second message different from the first message at an interval based on a difference between a first time associated with the first message and a second time associated with the second message.

Thereby, since a message and another message can be displayed at an interval based on each reception time, a user can intuitively recognize a time interval at which each of the messages has been received.

(b) In the display method according to the above (a), a step of causing the terminal to transmit a message may be further included, the storage step may further store the transmitted message and a time at which the message is transmitted, in the storage unit, in association with each other, the first message may be any of the message received in the receiving step or the message transmitted in the transmission step, and the second message may be any of the message received in the receiving step or the message transmitted in the transmission step.

Thereby, in any of between received messages, between transmitted messages, and between received messages and transmitted messages, it is possible to display a message at a display interval based on a difference a time at which the message is received and a time at which the message is transmitted. Therefore, a user can recognize a time interval spaced between a message and another message, at a glance.

(c) In the display method according to the above (a) or (b), in the display step, an interval between the first message and the second message may be displayed shortly when the difference between the first time and the second time is small, and an interval between the first message and the second message may be displayed longly when the difference between the first time and the second time is great.

Thereby, since each message can be displayed by shortening the display interval when a difference between times associated with a message and another message, respectively, is small, and lengthening the display interval when the difference is great, a user can intuitively recognize a time interval at which each message is received or transmitted.

(d) In the display method according to the above (a) to (c), in the display step, one or more messages transmitted and received within a predetermined period may be displayed using period display information indicating the predetermined period, and first period display information indicating a first predetermined period and second period display information indicating a second predetermined period different from the first predetermined period may be displayed at an interval based on a time between the first predetermined period and the second predetermined period.

Thereby, in a case where a large number of messages are exchanged and the past messages are desired to be confirmed, the arrangement thereof for each predetermined period facilitates a user's confirmation of the past messages.

(e) In the display method according to the above (d), in the display step, display information to be displayed so that a user is able to select the period display information may be generated, and messages transmitted and received in a predetermined period indicated by the period display information may be developed and displayed in a case where the period display information is selected.

Thereby, it is possible to confirm even contents of messages received in periods gathered all together by developing the contents.

(f) In the display method according to the above (a) to (e), in the display step, each of the messages may be stereoscopically displayed at the time interval.

Thereby, it is possible to display each message at an interval based on each reception time or transmission time in an aspect of attracting a user's interest.

What is claimed is:

1. A display method of displaying a message on a terminal, comprising:
receiving a first message and a second message, the second message being a message received after the first message from another terminal different from the terminal;
associating the first message and a first reception time at which the first message is received and a first storage time at which the first message is received in a storage;
associating the second message and a second reception time at which the second message is received and a second storage time at which the second message is received in the storage; and
displaying the first message and the second message stored in the storage spaced apart at a spacing interval, the spacing interval being proportional to a difference between a first time associated with the first message and a second time associated with the second message, the first time being one of the first reception time and the first storage time and the second time being one of the second reception time and the second storage time.

2. The display method according to claim 1, wherein the displaying includes displaying the spacing interval between the first message and the second message, the spacing interval being proportional to the difference between the first reception time of the first message and the second reception time of the second message.

3. The display method according to claim 1, wherein the displaying includes displaying one or more messages transmitted to and received from within a time period in units of a plurality of display periods, which include a first display period and a second display period different from the first display period, such that a first message group corresponding to the first display period and a second message group corresponding to the second display period are displayed at an another spacing interval proportional to a time between the first display period and the second display period.

4. The display method according to claim 3, wherein the displaying includes selecting one of the plurality of display periods and displaying messages transmitted and received during the selected one of the plurality of display periods in response to the selecting.

5. The display method according to claim 1, wherein the displaying includes displaying each of one or more messages at the spacing interval.

6. The display method according to claim 1, wherein the displaying displays the first message and the second message at the spacing interval, and further based on a spacing interval coefficient having a first value.

7. The display method according to claim 6, further comprising:
changing the spacing interval coefficient from the first value to a second value smaller than the first value in response to the spacing interval being greater than a threshold; and
re-calculating the spacing interval based on (1) the difference between the first time associated with the first message and the second time associated with the second message and (2) the second value of the spacing interval coefficient.

8. An information processing terminal that is configured to relay communication of a plurality of terminals and transmit display information for displaying a message transmitted from each terminal to the plurality of terminals, the information processing terminal comprising:
a communication circuit configured to transmit or receive one or more messages to or from another terminal;
a storage configured to store the one or more messages, the one or more messages including a first message and a second message; and
a controller configured to,
receive the first message and the second message, the second message being a message received after the first message from the another terminal,
associate the first message and a first reception time at which the first message is received and a first storage time at which the first message is received in the storage,
associate the second message and a second reception time at which the second message is received and a second storage time at which the second message is received in the storage, and
display the first message and the second message stored in the storage spaced apart at a spacing interval, the spacing interval being proportional to a difference between a first time associated with the first message and a second time associated with the second message, the first time being one of the first reception time and the first storage time and the second time being one of the second reception time and the second storage time.

9. The information processing terminal according to claim 8, wherein the controller is configured to display the spacing interval between the first message and the second message, the spacing interval being proportional to the difference between the first reception time of the first message and the second reception time of the second message.

10. The information processing terminal according to claim 8, wherein the controller is configured to display the one or more messages transmitted to and received from within a time period in units of a plurality of display periods, which include a first display period and a second display period different from the first display period, such that a first message group corresponding to the first display period and a second message group corresponding to the second display period are displayed at an another spacing interval proportional to a time between the first display period and the second display period.

11. The information processing terminal according to claim 10, wherein the controller is configured to select one of the plurality of display periods and display messages transmitted and received during the selected one of the plurality of display periods.

12. The information processing terminal according to claim 8, wherein the controller is configured to display each of the one or more messages at the spacing interval.

13. The information processing terminal according to claim 8, wherein the controller is further configured to display the first message and the second message at the spacing interval, and further based on a spacing interval coefficient having a first value.

14. The information processing terminal according to claim 13, wherein the controller is further configured to,
change the spacing interval coefficient from the first value to a second value smaller than the first value in response to the spacing interval being greater than a threshold; and
re-calculate the spacing interval based on (1) the difference between the first time associated with the first message and the second time associated with the second message and (2) the second value of the spacing interval coefficient.

15. A non-transitory computer readable recording medium having a display program stored thereon, when executed the display program causing a computer of a terminal to display messages transmitted to and received from another terminal on a display screen by:
receiving a first message and a second message, the second message being a message received after the first message from another terminal different from the terminal;
associating the first message and a first reception time at which the first message is received and a first storage time at which the first message is received in a storage;
associating the second message and a second reception time at which the second message is received and a second storage time at which the second message is received in the storage; and
displaying the first message and the second message stored in the storage spaced apart at a spacing interval, the spacing interval being proportional to a difference between a first time associated with the first message and a second time associated with the second message, the first time being one of the first reception time and the first storage time and the second time being one of the second reception time and the second storage time.

16. The non-transitory computer readable recording medium according to claim 15, wherein the displaying includes displaying the first message and the second message at the spacing interval, and further based on a spacing interval coefficient having a first value.

17. The non-transitory computer readable recording medium according to claim 16, wherein the displaying further includes, changing the spacing interval coefficient from the first value to a second value smaller than the first value in response to the spacing interval being greater than a threshold, and re-calculating the spacing interval based on (1) the difference between the first time associated with the first message and the second time associated with the second message and (2) the second value of the spacing interval coefficient.

* * * * *